(12) United States Patent  
Agrawal et al.

(10) Patent No.: US 9,246,552 B2  
(45) Date of Patent: Jan. 26, 2016

(54) DIGITAL SHUNT REGULATOR FOR NFC DEVICES

(71) Applicant: Texas Instruments Incorporated, Dallas, TX (US)

(72) Inventors: Abhishek Agrawal, Corvallis, OR (US); Yogesh Darwhekar, Bangalore (IN); Gireesh Rajendran, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 21 days.

(21) Appl. No.: 14/318,606

(22) Filed: Jun. 28, 2014

(65) Prior Publication Data

US 2015/0004909 A1  Jan. 1, 2015

Related U.S. Application Data

(60) Provisional application No. 61/840,976, filed on Jun. 28, 2013.

(51) Int. Cl.
```
H04B 5/00      (2006.01)
H04B 17/00     (2015.01)
H02M 7/217     (2006.01)
```

(52) U.S. Cl.  
CPC .............. *H04B 5/0031* (2013.01); *H02M 7/217* (2013.01)

(58) Field of Classification Search  
CPC ...... H04B 5/02; H04B 5/0056; H04B 5/0062; H04B 17/318; H02H 3/20; H02H 9/04; H02H 9/046

USPC .................................... 455/41.1, 41.2, 67.11  
See application file for complete search history.

(56) References Cited

U.S. PATENT DOCUMENTS

| | | | | |
|---|---|---|---|---|
| 6,608,470 B1 * | 8/2003 | Oglesbee | .............. | H01M 2/348 320/135 |
| 7,586,716 B2 * | 9/2009 | Yamazaki | ............... | G05F 1/613 361/18 |
| 2011/0306295 A1 * | 12/2011 | Butler | ..................... | G05F 1/613 455/41.1 |
| 2014/0266118 A1 * | 9/2014 | Chern | .................... | H02M 3/156 323/283 |

\* cited by examiner

*Primary Examiner* — Quochien B Vuong  
(74) *Attorney, Agent, or Firm* — John Pessetto; Frank D. Cimino

(57) ABSTRACT

A digital shunt regulator receives a radio frequency (RF) signal at an antenna which generates a differential output signal over a differential path. A peak detector is coupled to the antenna and receives the differential output signal over the differential path. A first comparator receives a voltage output of the peak detector and a first voltage. A second comparator receives the voltage output of the peak detector and a second voltage. A digital state machine receives an output of the first comparator and an output of the second comparator. A plurality of shunt NMOS transistors receives an output of the digital state machine. The digital state machine is configured to control the number of shunt NMOS transistors that are activated to maintain the voltage output of the peak detector between the first voltage and the second voltage.

20 Claims, 4 Drawing Sheets

DIGITAL SHUNT REGULATOR FOR NFC DEVICES

CROSS REFERENCES TO RELATED APPLICATIONS

This application claims priority from U.S. provisional patent application No. 61/840,976 filed on Jun. 28, 2013, which is hereby incorporated by reference in its entirety.

TECHNICAL FIELD

Embodiments of the disclosure relate to near field communication (NFC) devices and more particularly to voltage regulation in NFC devices.

BACKGROUND

NFC is a 13.56 MHz carrier based secure communication technology which has found its uses in as personal ID, money transaction etc. An NFC system includes an NFC tag that contains information and an NFC reader that reads information from the NFC tag. An NFC tag can be a passive NFC tag or an active NFC tag. The passive NFC tag utilizes the magnetic field or radio frequency (RF) field generated by an NFC reader for operation. When the magnetic field of the NFC reader is incident on the antenna of the passive NFC tag, a controller inside the passive NFC tag accesses its internal memory and provides information to the NFC reader by modulating the incident magnetic field. An active NFC tag generates its own magnetic field to interact with an NFC reader. It is to be noted that NFC communication technology works on the same principle as RF communication technology. Hence, the NFC devices (readers/tags) can interchangeably interact with RF devices (readers/tags).

An NFC device can communicate to a range of 50 mm, and the incident magnetic field or RF field on NFC device antenna can vary from 0.15 A/m to 12 A/m. Various applications require an NFC device antenna to have a high dynamic range. At higher field extremes, very high voltage swing is present on the NFC device antenna that could reach excess of 40 volt which would damage the NFC device.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

An example embodiment provides a digital shunt regulator. The digital shunt regulator includes an antenna that receives a radio frequency (RF) signal and generates a differential output signal over a differential path. A peak detector is coupled to the antenna and receives the differential output signal over the differential path. A first comparator receives a voltage output of the peak detector and a first voltage. A second comparator receives the voltage output of the peak detector and a second voltage. A digital state machine receives an output of the first comparator and an output of the second comparator. A plurality of shunt NMOS transistors receives an output of the digital state machine. The digital state machine is configured to control the number of shunt NMOS transistors that are activated to maintain the voltage output of the peak detector between the first voltage and the second voltage.

Another example embodiment provides a near field communication (NFC) device. The NFC device includes an antenna that receives a radio frequency (RF) signal and generates a differential output signal over a differential path. A peak detector is coupled to the antenna and receives the differential output signal over the differential path. A first comparator receives a voltage output of the peak detector and a first voltage. A second comparator receives the voltage output of the peak detector and a second voltage. A digital state machine receives an output of the first comparator and an output of the second comparator. A plurality of shunt NMOS transistors receives an output of the digital state machine. The digital state machine is configured to control the number of shunt NMOS transistors that are activated to maintain the voltage output of the peak detector between the first voltage and the second voltage.

Another example embodiment provides a method of regulating a radio frequency (RF) signal. A differential output signal is generated from the RF signal. The peak voltage of the differential output signal is detected and compared with a first voltage and second voltage. A set of shunt NMOS transistors of a plurality of shunt NMOS transistors is activated if the peak voltage is more than the second voltage and a set of shunt NMOS transistors of the plurality of shunt NMOS transistors is deactivated if the peak voltage is less than the first voltage.

Other aspects and example embodiments are provided in the Drawings and the Detailed Description that follows.

BRIEF DESCRIPTION OF THE VIEWS OF DRAWINGS

DETAILED DESCRIPTION OF THE EMBODIMENTS

Figure 1:
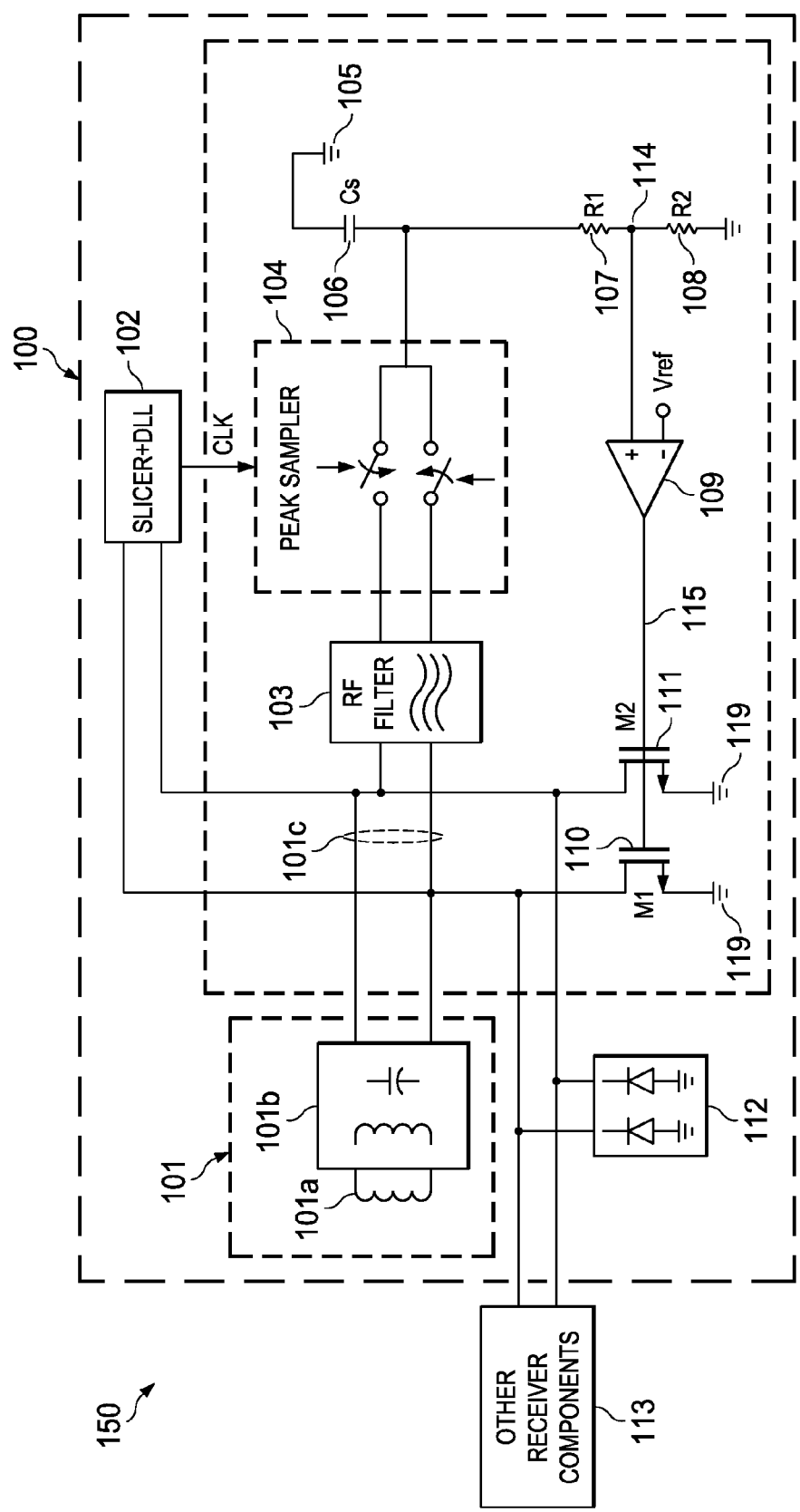
FIG. 1 illustrates a schematic of a receiver with analog shunt regulator according to an embodiment.

FIG. 1 illustrates a schematic of a receiver 150 that includes an analog shunt regulator 100. The analog shunt regulator 100 includes an antenna assembly 101. The antenna assembly 101 includes an antenna 101a and matching network 101b. The analog shunt regulator 100 receives a radio frequency (RF) signal at the antenna 101a. The antenna assembly 101 is coupled to an RF filter 103 through a differential path 101c. A clamp circuit 112 is coupled to the differential path 101c. A peak sampler 104 is coupled to the output of RF filter 103. A block 102 that contains slicer and digital locked loop (DLL) provides clock signal to the peak sampler 104, RF filter 103 and other receiver components 113. The other receiver components 113 include any of memory, controller, processing device and IF (Intermediate frequency) filters. The peak sampler 104 is coupled to a capacitor 106 and a voltage-divider circuit that includes resistor R1 107 and resistor R2 108. A shunt amplifier 109 receives a reference voltage Vref and a signal from a node 114 which is between resistor R1 107 and resistor R2 108. The output of shunt amplifier 109 is connected to shunt NMOS transistors M1 110 and M2 111. The shunt NMOS transistors M1 110 and M2 111 are further coupled to the differential path 101c. In some embodiments, the analog shunt regulator 100 includes plurality of shunt NMOS transistors. In one embodiment, the shunt NMOS transistors M1 110 and M2 111 are any of regulating devices known in the art. One terminal of the shunt NMOS transistors M1 110 and M2 111 is connected to the ground terminal 119.

The operation of the analog shunt regulator 100 illustrated in FIG. 1 is now explained. The antenna 101a receives a radio frequency (RF) signal from a neighboring device and generates a differential output signal over the differential path 101c. The neighboring device is one of RF device, NFC device or any field communication device. The matching network 101b is a passive network that is used for impedance matching between the antenna 101a and the differential path 101c. The clamp circuit 112 clamps the differential output signal to remove the negative component of the differential output signal. The RF filter 103 removes the unwanted harmonics from the differential output signal. The peak sampler 104 in conjunction with the capacitor 106 detects the peak voltage of the signal from the RF filter 103. The peak sampler and the RF filter are synchronized by the clock signal from the block 102 which contains the slicer and digital locked loop (DLL). The peak voltage signal from the peak sampler 104 is received by the voltage divider circuit that includes the resistor R1 107 and resistor R2 108. Based on the values of the resistor R1 107 and resistor R2 108, a corresponding voltage is generated at node 114. The voltage at node 114 is compared with the reference voltage Vref by the shunt amplifier 109 and a residual error voltage is generated. The residual error voltage is amplified by the shunt amplifier 109 to generate the shunt amplifier output on line 115. The shunt amplifier output on line 115 controls the resistance of the shunt NMOS transistors M1 110 and M2 111 by controlling a bias gate voltage of the shunt NMOS transistors M1 110 and M2 111. A high field strength of RF signal at the antenna 101a would result in very high potential at differential path 101c. Therefore, when there is very high potential at differential path 10k, the shunt amplifier output on line 115 is high thus providing high potential on the gate terminals of the shunt NMOS transistors M1 110 and M2 111. This offers a very low resistance to the high potential at the differential path 101e, which discharges through the shunt NMOS transistors M1 110 and M2 111 to the ground 119. Thus, the other receiver components 113 are not subjected to the high potential at the differential path 101c.

The receiver 150 requires that the step response of shunt regulator 100 should not have any undesirable overshoot or undershoot which could potentially be misinterpreted as response to incoming ASK modulation. This is important for reliable detection of the received RF signal. The feedback system of the shunt regulator 100 should have a good phase margin to avoid ringing in step response. Ringing refers to the unstable response of the regulator when there is transition in step input to the regulator. However, the analog shunt regulator 100 has a poor phase margin given the complex nature of the feedback loop. Also, the stability of the feedback loop of the shunt regulator 100 is heavily impacted by the delay introduced by peak sampler 104, phase shift of the RF filter 103, variable impedance offered by the clamp 112 and the matching network 101b. In addition, different application demands different type of antenna and matching network, which makes the task of stabilizing the feedback loop very difficult.

Figure 2A:
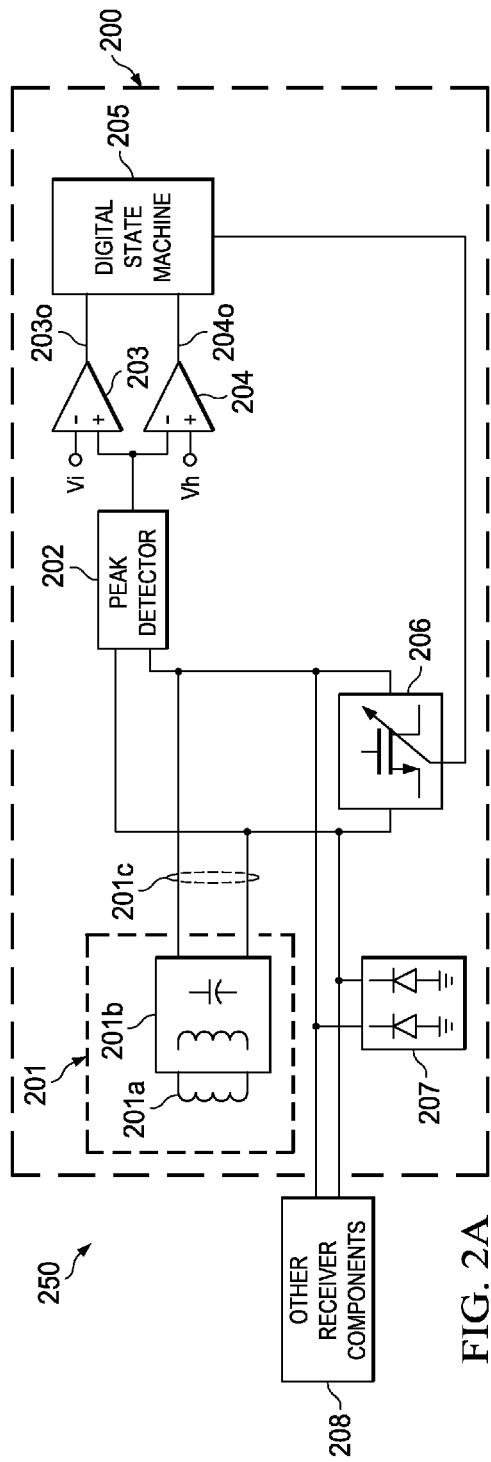
FIG. 2A illustrates a schematic of a receiver with digital shunt regulator according to an embodiment.

FIG. 2A illustrates a schematic of a receiver 250 that includes a digital shunt regulator 200. The digital shunt regulator 200 includes an antenna assembly 201. The antenna assembly 201 further includes an antenna 201a and a matching network 201b. The digital shunt regulator 200 receives a radio frequency (RF) signal at the antenna 201a. The digital shunt regulator 200 in one embodiment includes an RF filter and a block containing slicer and digital locked loop (DLL) which is similar in connection and operation as indicated in description of FIG. 1. The antenna assembly 201 is coupled to a peak detector 202 through a differential path 201c. A clamp circuit 207 is coupled to the differential path 201c. Other receiver components 208 include any of memory, controller, processing device and IF (Intermediate frequency) filters. A first comparator 203 receives the voltage output of the peak detector 202 and a first voltage Vi. The first voltage Vi defines the lower threshold voltage. A second comparator 204 receives the voltage output of the peak detector 202 and a second voltage Vh. The second voltage Vh defines the upper threshold voltage. A digital state machine 205 is configured to receive the output of the first comparator 203 and the output of the second comparator 204. A plurality of shunt NMOS transistors 206 is configured to receive the output of the digital state machine 205. In one embodiment, the shunt NMOS transistors are any of switching devices known in the art. The plurality of shunt NMOS transistors 206 is coupled to the differential path 201c thereby forming a digital feedback loop. The plurality of shunt NMOS transistors 206 and the peak detector 202 are thus connected in parallel.

The operation of the digital shunt regulator 200 illustrated in FIG. 2A is now explained. The antenna 201a receives a radio frequency (RF) signal from a neighboring device to generate a differential output signal over the differential path 201c. The neighboring device is one of RF device, NFC device or any field communication device. The matching network 201b is a passive network that is used for impedance matching between the antenna 201a and the differential path 201c. The peak detector 202 detects the peak voltage of the differential output signal received over the differential path 201c and generates a voltage output. The voltage output from the peak detector 202 defines the peak voltage of the differential output signal. The voltage output from the peak detector 202 is received by the first comparator 203 and the second comparator 204. The first comparator 203 compares the voltage output of the peak detector and the first voltage Vi and generates a first comparator output on line 203o. The second comparator 204 compares the voltage output of the peak detector and the second voltage Vh and generates a second comparator output on line 204o. The first comparator output on line 203o and the second comparator output on line 204o are received by the digital state machine 205. Based on the results from the first comparator 203 and the second comparator 204, the digital state machine 205 controls the number of shunt NMOS transistors of the plurality of shunt NMOS transistors 206 that are activated to maintain voltage output of the peak detector between the first voltage Vi and the second voltage Vh. The digital state machine 205 controls the resistance offered by the plurality of the shunt NMOS transistors 206 by activating a set of shunt NMOS transistors of a plurality of shunt NMOS transistors 206 if the peak voltage is more than the second voltage and deactivating a set of shunt NMOS transistors of the plurality of shunt NMOS transistors 206 if the peak voltage is less than the first voltage. Therefore, when there is very high potential at the differential path 201c such that the voltage output of the peak detector 202 is more than the second voltage, the digital state machine 205 would increase the number of shunt NMOS transistors that are activated. This offers a very low resistance to the high potential at the differential path 201$c$ which discharges through the plurality of shunt NMOS transistors 206 to the ground. Thus, the other receiver components 208 are not subjected to the high potential at the differential path 201$c$. The digital state machine 205 decreases the number of transistors that are activated if the voltage output of the peak detector is less than the first voltage.

Figure 2B:
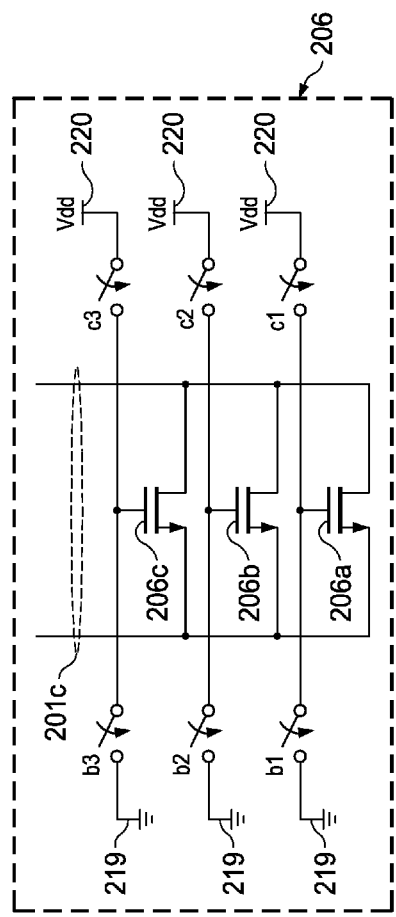
FIG. 2B illustrates the configuration of the plurality of shunt NMOS transistors illustrated in FIG. 2A.

FIG. 2B illustrates the configuration of the plurality of shunt NMOS transistors 206 illustrated in FIG. 2A. The plurality of shunt NMOS transistors 206$a$, 206$b$ and 206$c$ are connected to ground terminal 219 through a plurality of switches b1, b2, b3 and connected to voltage terminal Vdd through a plurality of switches c1, c2, c3. It is to be noted that c1, c2, and c3 are inverse of b1, b2 and b3 respectively. For example, c1 is inverse of b1. Thus, when b1 is in ON state then c1 will be in OFF state. During this state, shunt NMOS transistors 206$a$ would be connected to ground terminal 219 through switch b1. It is understood that this principle is followed by other pair of switches (b2, c2 and b3, c3) as well. The plurality of shunt NMOS transistors 206$a$, 206$b$ and 206$c$ are connected to differential path 201$c$. The plurality of switches b1, b2, b3 and d, c2, c3 is controlled by the digital state machine 205.

The functioning of digital state machine 205 in conjunction with the plurality of shunt NMOS transistors 206 depicted in FIG. 2A is now explained. The digital state machine uses a digital logic to activate the plurality of switches b1, b2, b3 and c1, c2, c3. One of the digital logic used by the digital state machine is SAR (Successive approximation register) logic which is explained later in the description with the help of FIG. 3. The digital state machine 205 uses the output of the first comparator 203 and the second comparator 204 to control the resistance that is offered by the plurality of shunt NMOS transistors 206 by activating appropriate number of shunt NMOS transistors and ensures that the voltage output of the peak detector is between Vh and Vi. The second voltage Vh is used to avoid the voltage at the differential path 201$c$ to go above the device reliability limit. The first voltage Vi is used to avoid shunting, when too many shunt NMOS transistors at the differential path 201$c$ are ON, which can reduce the incident RF signal amplitude below optimum. Initially when RF field is incident on the antenna 201$a$, the plurality of shunt NMOS transistors 206 are activated, which prevent reliability issue at higher field. Once calibration is activated, the digital state machine 205 uses the comparison results from both comparators 203 and 204 to activate the shunt NMOS transistors so that the voltage output of the peak detector is within Vh and Vi, in successive steps. The number of steps can be determined by the digital logic used by the digital state machine 205. Once the voltage output of the peak detector is within the upper and lower threshold, the bit state of the digital state machine 205 is configured to be constant and not modified further. Thereafter, the digital shunt regulator 200 operates in an open loop manner.

One of the advantages of the digital shunt regulator 200 is open loop nature of the circuit which ensures high stability. Further, a digital feedback loop in the digital shunt regulator 200 provides more flexibility to control the voltage at the differential path 201$c$ to desire value. In addition, the area used to implement digital shunt regulator 200 is four times lesser than used for analog shunt regulator 100. This is because in digital shunt regulator 200, the shunt NMOS transistors of the plurality of shunt NMOS transistors 206 are connected in parallel whereas in the analog shunt regulator 100, the pair of shunt NMOS transistors formed a series network.

Figure 3:
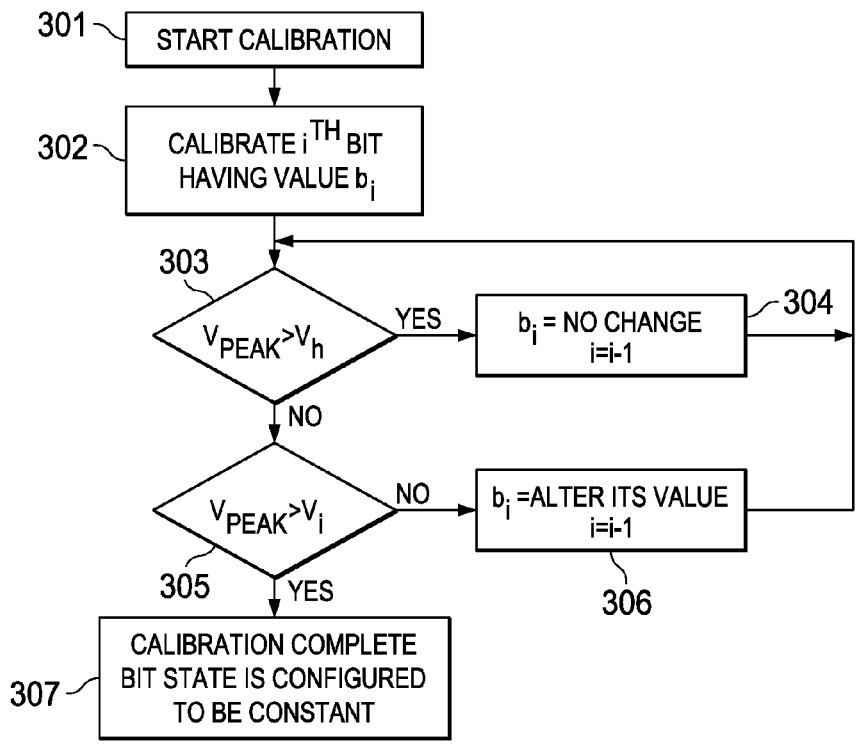
FIG. 3 illustrates a digital state machine implementing SAR logic according to an embodiment.

FIG. 3 illustrates a digital state machine implementing SAR logic according to an embodiment. On receiving the comparison results from the comparators 203 and 204, the digital state machine starts calibration at step 301. Initially, all the shunt NMOS transistors of the plurality of shunt NMOS transistors 206 are turned ON. Also, the calibration is made from MSB to LSB. The logic is implemented for N bits and in one cycle, calibration of only one bit is completed. At step 302, calibration of $i^{th}$ bit is initiated which is having a value of $b_i$. At step 303, the digital state machine 205 analyzes the results from comparator 204 which compares the peak voltage from the peak detector 202 Vpeak and the upper threshold voltage Vh. If the value of Vpeak is more as compared to the upper threshold voltage Vh, the system advances to step 304. At step 304, the value of the ith bit is not altered and the value remains bi. Further, the system reduces the bit count by one to i−1 and the system returns to step 302 for calibration of i−$1^{th}$ bit. If at step 303, Vpeak is less than Vh, the system advances to step 305. At step 305, the digital state machine 205 analyzes the results from the comparator 203 which compares the peak voltage from the peak detector 202 Vpeak with the lower threshold voltage Vi. If the value of Vpeak is more as compared to the lower threshold voltage Vi, the system advances to step 307. At step 307, the system configures the bit state of the digital state machine 205 to be constant since Vpeak is between Vh and Vi and no further calibration is carried out for the remaining bits. If at step 305, Vpeak is less than Vi, the value of the bit is changed to inverse of $b_i$ ($b_i'''$). Further, the system reduces the bit count by one to i−1 and the system returns to step 302 for calibration of i−$1^{th}$ bit. In some embodiments, the digital state machine implements a digital logic in which the state of bits is changed sequentially to maintain the voltage output of the peak detector in between the first voltage and the second voltage and the state of bits is configured to be constant when the voltage output of the peak detector is in between the first voltage and the second voltage.

Figure 4:
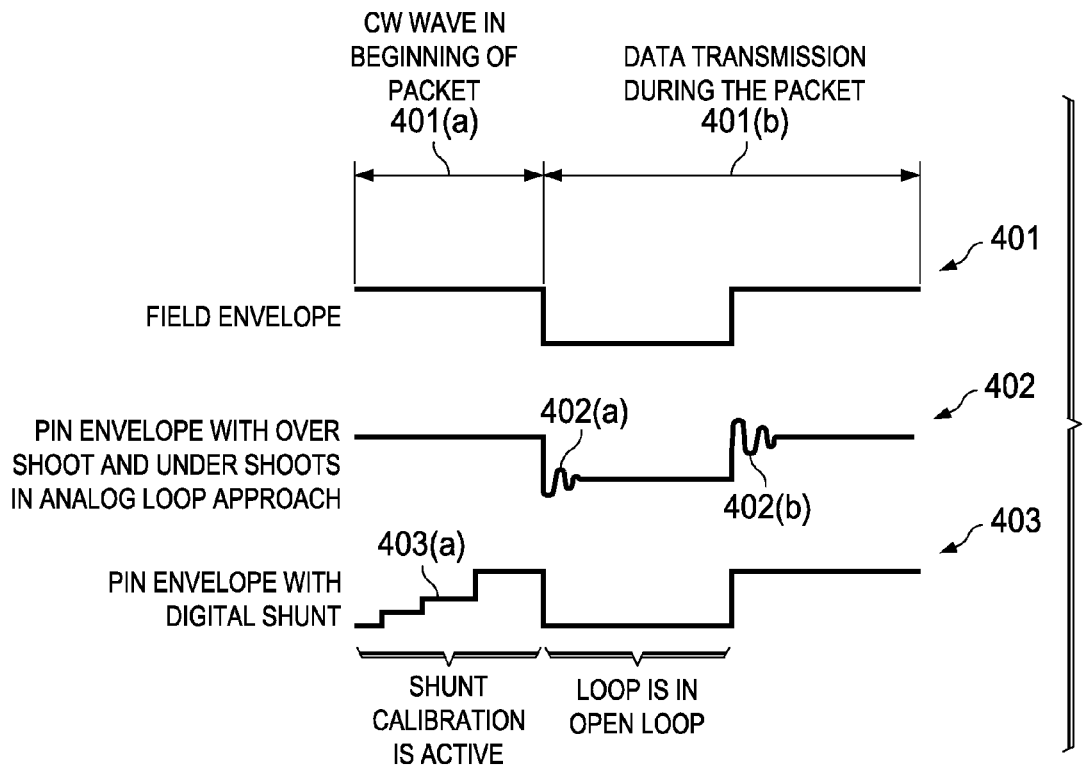
FIG. 4 illustrates the response of the analog shunt regulator and the digital shunt regulator to the incident radio frequency (RF) field according to an embodiment.

FIG. 4 illustrates the response of the analog shunt regulator 100 and digital shunt regulator 200 to the incident radio frequency (RF) signal 401 at the antenna. The RF signal 401 consists of a continuous wave (CW) 401$a$ at the initialization of the transmission. This is followed by data transmission 401$b$ illustrated by a step response. The response of analog shunt regulator 100 to the incident RF signal 401 is illustrated as 402. It can be seen that the analog shunt regulator 100 involves ringing 402$a$ and 402$b$ during the RF signal transitions. Ringing refers to the unstable response of the shunt regulator when there is transition in RF input to the regulator. Since, the analog shunt regulator 100 has a poor phase margin given the complex nature of the feedback loop, it shows ringing effect during transitions. The response of digital shunt regulator 200 to the incident RF signal 401 is illustrated as 403. The initial calibration of the digital state machine 205 is represented by 403$a$. Thus the system calibration is completed before the packet containing data is received by the receiver and therefore the system operates in open loop manner after the initial calibration. The impedance of the digital feedback loop in the digital shunt regulator 200 does not change during data reception which ensures that the system time constant does not vary and hence no ringing is seen at the differential path 201$c$. Thus undesired undershoot or overshoot in the step response is avoided during data reception. It also eases the task of data reception and improves BER (bit error rate). In addition the digital shunt regulator 200 consumes low power as compared to continuous running shunt loop in analog shunt regulator 100 illustrated in FIG. 1. This is because the calibration in digital shunt regulator 200 is completed in short frame of time and thereafter the circuit operates in open loop manner.

Figure 5:
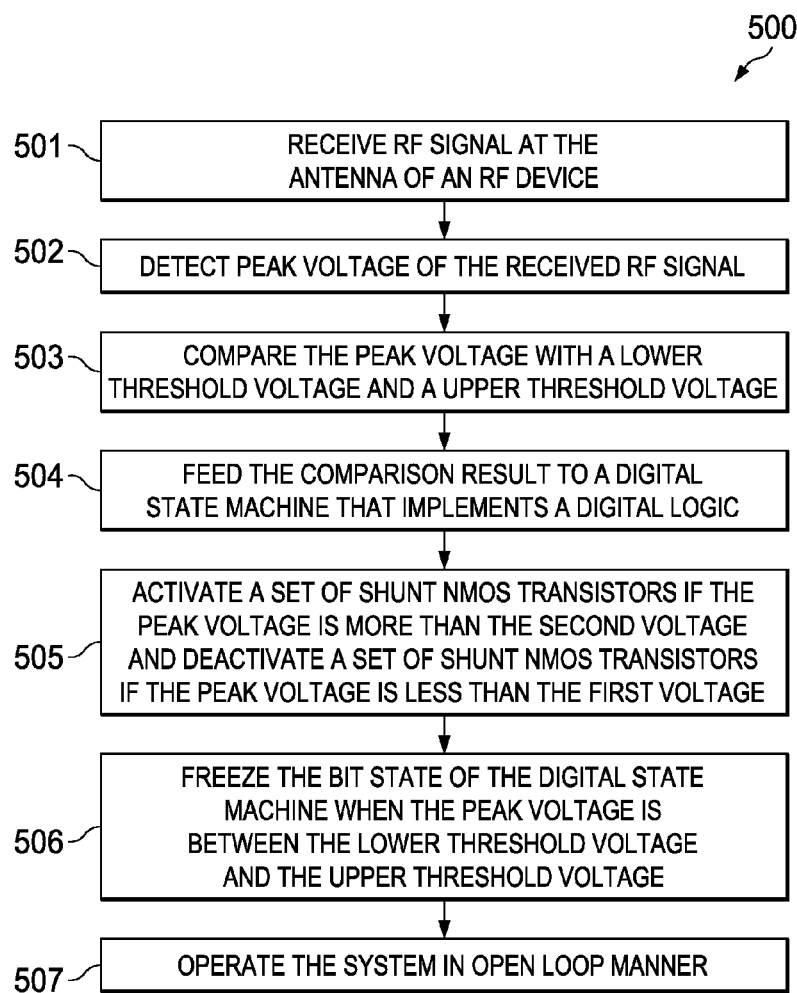
FIG. 5 is a flowchart illustrating a method of regulating a radio frequency (RF) signal according to an embodiment.

FIG. 5 is a flowchart 500 illustrating a method of regulating a radio frequency (RF) signal according to an embodiment. At step 501, the RF signal is received at the antenna 201a of an RF device. A peak detector 202 detects the peak voltage of the received RF signal at step 502. At step 503, the peak voltage from the peak detector 202 is compared with a lower threshold voltage Vi and an upper threshold voltage Vh. The comparison results are fed to a digital state machine 205 that implements a digital logic at step 504 for example SAR (Successive approximation register) logic. At step 505, based on the comparison results, the digital state machine 205 activates a set of shunt NMOS transistors of a plurality of shunt NMOS transistors 206 if the peak voltage is more than the second voltage and deactivates a set of shunt NMOS transistors of the plurality of shunt NMOS transistors 206 if the peak voltage is less than the first voltage. The bit state of the digital state machine 205 is configured to be constant when the peak voltage from the peak detector 202 is between the lower threshold voltage Vi and the upper threshold voltage Vh, at step 506. The RF device then operates in an open loop manner at step 507.

Figure 6:
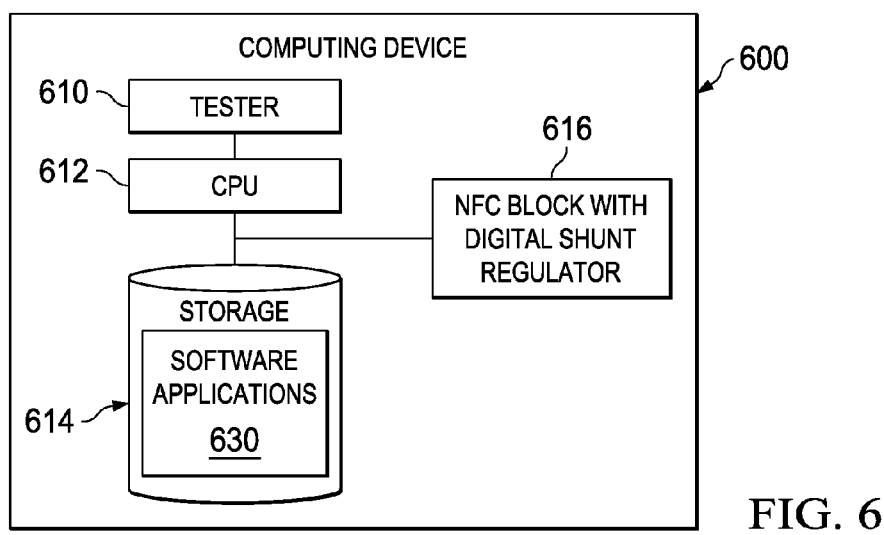
FIG. 6 illustrates a computing device using the digital shunt regulator according to an embodiment.

FIG. 6 illustrates a computing device according to an embodiment. The computing device 600 is, or is incorporated into, a mobile communication device, such as a mobile phone, a personal digital assistant, a personal computer, or any other type of electronic system.

In some embodiments, the computing device 600 comprises a megacell or a system-on-chip (SoC) which includes control logic such as a CPU 612 (Central Processing Unit), a storage 614 (e.g., random access memory (RAM)) and a tester 610. The CPU 612 can be, for example, a CISC-type (Complex Instruction Set Computer) CPU, RISC-type CPU (Reduced Instruction Set Computer), or a digital signal processor (DSP). The storage 614 (which can be memory such as RAM, flash memory, or disk storage) stores one or more software applications 630 (e.g., embedded applications) that, when executed by the CPU 612, perform any suitable function associated with the computing device 600. The tester 610 comprises logic that supports testing and debugging of the computing device 600 executing the software application 630. For example, the tester 610 can be used to emulate a defective or unavailable component(s) of the computing device 600 to allow verification of how the component(s), were it actually present on the computing device 600, would perform in various situations (e.g., how the component(s) would interact with the software application 630). In this way, the software application 630 can be debugged in an environment which resembles post-production operation.

The CPU 612 typically comprises memory and logic which store information frequently accessed from the storage 614. The computing device 600 includes NFC block with digital shunt regulator 616 which is used for communication with neighboring field devices. The NFC block with digital shunt regulator 616 is analogous to the digital shunt regulator 200 in connections and operation. The open loop nature of the digital shunt regulator 200 ensures high stability. Further, a digital feedback circuit in the digital shunt regulator 200 provides more flexibility to control the antenna voltage to a desired value. In addition, the area used to implement digital shunt regulator 200 is four times lesser than used for analog shunt regulator 100, therefore occupying lesser area on the computing device 600.

In the foregoing discussion, the terms "connected" means at least either a direct electrical connection between the devices connected or an indirect connection through one or more passive intermediary devices. The term "circuit" means at least either a single component or a multiplicity of passive components, that are connected together to provide a desired function. The term "signal" means at least one current, voltage, charge, data, or other signal. Also, the terms "coupled to" or "couples with" (and the like) are intended to describe either an indirect or direct electrical connection. Thus, if a first device is coupled to a second device, that connection can be through a direct electrical connection, or through an indirect electrical connection via other devices and connections. The term "on" applied to a transistor or group of transistors is generally intended to describe gate biasing to enable current flow through the transistor or transistors.

The foregoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A digital shunt regulator comprising:
an antenna configured to receive a radio frequency (RF) signal and generate a differential output signal over a differential path;
a peak detector configured to receive the differential output signal over the differential path;
a first comparator coupled to a voltage output of the peak detector and configured to receive a first voltage;
a second comparator coupled to the voltage output of the peak detector and configured to receive a second voltage;
a digital state machine configured to receive an output of the first comparator and an output of the second comparator; and
a plurality of shunt NMOS transistors configured to receive an output of the digital state machine, wherein, the digital state machine is configured to control the number of shunt NMOS transistors that are activated to maintain the voltage output of the peak detector between the first voltage and the second voltage.

2. The digital shunt regulator of claim 1, wherein the plurality of shunt NMOS transistors is coupled to the differential path thereby forming a digital feedback loop, wherein the differential output signal is received by the plurality of shunt NMOS transistors on the differential path.

3. The digital shunt regulator of claim 1, wherein the shunt NMOS transistors of the plurality of shunt NMOS transistors are connected in parallel and also the plurality of shunt NMOS transistors is connected in parallel to the peak detector.

4. The digital shunt regulator of claim 1, wherein the first voltage is lower threshold voltage and the second voltage is upper threshold voltage.

5. The digital shunt regulator of claim 1, wherein the plurality of shunt NMOS transistors is configured to be activated prior to receiving data on the RF signal.

6. The digital shunt regulator of claim 1, wherein the digital state machine is an N bit digital state machine and state of bits is configured to change sequentially to maintain the voltage output of the peak detector in between the first voltage and the second voltage and the state of bits is configured to be constant when the voltage output of the peak detector is in between the first voltage and the second voltage.

7. The digital shunt regulator of claim 1, wherein the digital state machine is configured to increase the number of shunt NMOS transistors that are activated if the voltage output of the peak detector is more than the second voltage and the digital state machine is configured to decrease the number of shunt NMOS transistors that are activated if the voltage output of the peak detector is less than the first voltage.

8. The digital shunt regulator of claim 1 is configured to operate in open loop when the voltage output of the peak detector is between the first voltage and the second voltage.

9. A near field communication (NFC) device, comprising:
an antenna configured to receive a radio frequency (RF) signal and generate a differential output signal over a differential path;
a peak detector configured to receive the differential output signal over the differential path;
a first comparator coupled to a voltage output of the peak detector and configured to receive a first voltage;
a second comparator coupled to the voltage output of the peak detector and configured to receive a second voltage;
a digital state machine configured to receive an output of the first comparator and an output of the second comparator; and
a plurality of shunt NMOS transistors configured to receive an output of the digital state machine, wherein, the digital state machine is configured to control the number of shunt NMOS transistors that are activated to maintain the voltage output of the peak detector between the first voltage and the second voltage.

10. The NFC device of claim 9, wherein the plurality of shunt NMOS transistors is coupled to the differential path thereby forming a digital feedback loop, wherein the differential output signal is received by the plurality of shunt NMOS transistors on the differential path.

11. The NFC device of claim 9, wherein the shunt NMOS transistors of the plurality of shunt NMOS transistors are connected in parallel and also the plurality of shunt NMOS transistors is connected in parallel to the peak detector.

12. The NFC device of claim 9, wherein the first voltage is lower threshold voltage and the second voltage is upper threshold voltage.

13. The NFC device of claim 9, wherein the digital state machine is configured to control the number of shunt NMOS transistors that are activated through a digital logic.

14. The NFC device of claim 13, wherein the digital logic is configured to:

calibrate a first bit of the N bits, wherein the first bit has a value bi;
compare the voltage output of the peak detector and the second voltage;
calibrate a second bit of the N bits if voltage output of the peak detector is more than the second voltage and keeping the value of first bit as bi;
compare the voltage output of the peak detector and the first voltage if the voltage output of the peak detector is less than the second voltage;
calibrate a second bit of the N bits if voltage output of the peak detector is less than the first voltage and changing the value of first bit to inverse of bi; and
configure the N bits of the digital state machine to be constant when the output of the peak detector is less than the second voltage and more than the first voltage.

15. The NFC device of claim 14, further comprising completing the calibration of N bits before receiving data on RF signal.

16. A method of regulating a radio frequency (RF) signal comprising:
receiving an RF signal to generate a differential output signal;
detecting a peak voltage of the differential output signal;
comparing the peak voltage with a first voltage and a second voltage;
determining if the peak voltage is between the first voltage and the second voltage;
activating a set of shunt NMOS transistors of a plurality of shunt NMOS transistors if the peak voltage is more than the second voltage; and
deactivating a set of shunt NMOS transistors of the plurality of shunt NMOS transistors if the peak voltage is less than the first voltage.

17. The method of claim 16, wherein the first voltage is lower threshold voltage and the second voltage is upper threshold voltage.

18. The method of claim 16 further comprising activating the plurality of shunt NMOS transistors prior to receiving data on RF signal.

19. The method of claim 16 further comprising configuring the plurality of shunt NMOS transistors to receive the differential output signal, wherein the plurality of shunt NMOS transistors are connected in parallel.

20. The method of claim 16 further comprising operating in an open loop when the peak voltage is between the first voltage and the second voltage.

* * * * *